J. M. PALMER.
Pistons for Steam-Engines.

No. 154,516.

Patented Aug. 25, 1874.

Witnesses:
Fred Haynes
D. Musell

J. M. Palmer
per Brown & Allen
Attorneys

UNITED STATES PATENT OFFICE.

JACOB M. PALMER, OF WILLIAMSBURG, BROOKLYN, NEW YORK.

IMPROVEMENT IN PISTONS FOR STEAM-ENGINES.

Specification forming part of Letters Patent No. 154,516, dated August 25, 1874; application filed March 15, 1873.

*To all whom it may concern:*

Be it known that I, JACOB M. PALMER, of Williamsburg, Brooklyn, in the county of Kings and State of New York, have invented an Improvement in Pistons for Steam-Engines, of which the following is a specification:

This invention consists in a certain construction of the piston and arrangement of packing-rings whereby the latter may be held out properly by steam without the use of valves; and the necessity for springing the packing-rings over flanges is obviated, the hub of the piston being formed with a central rim, from both sides of which extend flanges, while the rim is continued beyond such side flanges, so that with the removable caps seats or rabbets are formed for the packing-rings.

Figure 1:
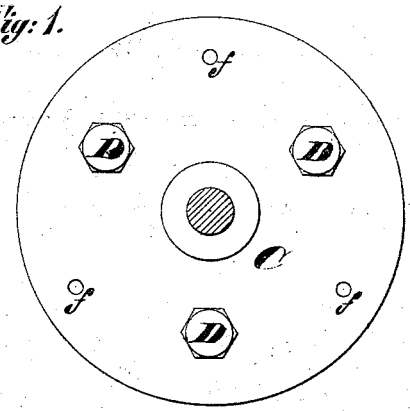
Figure 3:
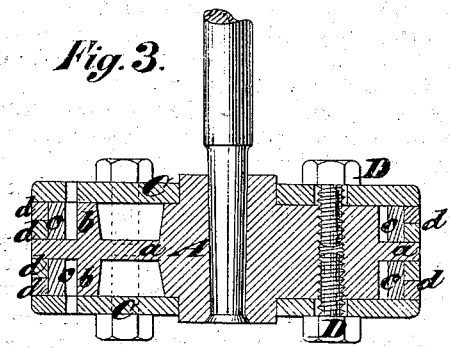
Figure 2:
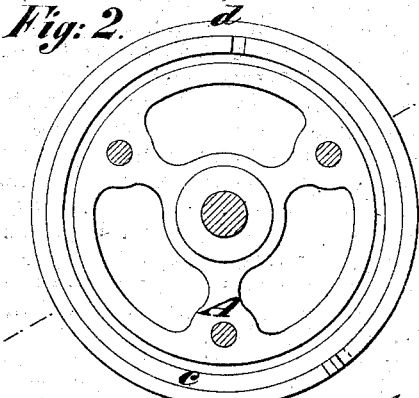

In the accompanying drawing, Figure 1 is an end view of a piston made according to my invention. Fig. 2 is a similar view with one of its followers removed; and Fig. 3 is a transverse section thereof.

Similar letters of reference indicate corresponding parts in all three figures.

A is the head of the piston. It consists of a hub with a central flange, $a$, extending around it. Near the periphery of this flange there extends from it two rims, $b\,b$, one from each side. In reality two rabbets are thus formed in the periphery of the piston, and in each of these fits a set of packing-rings, $c\,d\,d$, which are of such size as to leave a space between them and the rim $b$. These sets of rings consist of one wide inner ring, $c$, which in width fills the rabbet and two outer rings, $d\,d$, which together are of the same width as the ring $c$. The ends of the two outer rings of course come opposite the body of the inner ring $c$, so that when they all expand the joints will be kept tight and the escape of steam will be prevented. A cap or follower, C, is secured to each side of the piston-head by screws or bolts D D, and retains the rings in place laterally. In each of these caps there are holes $f\,f$, communicating with the space behind the packing-rings to permit the ingress of steam thereto, for the purpose of forcing the rings out and maintaining a tight fit within the cylinder.

I am aware of the patent granted to H. D. Dunbar, August 14, 1860, in which a piston-head is constructed by fitting a ring upon a hub, said ring having a projecting central flange, upon each side of which are arranged packing-rings, the ring being removable, so as to place the rings on each side of the central flange when it is removed from the hub, the object of such being to avoid the springing over the projecting flange of the packing-rings. Such construction necessitates a true finish of the periphery of the hub and the interior of the ring, and renders it necessary to detach all the parts to place the rings in place. Such construction is therefore disclaimed, as it is not my invention, which, as before stated, consists in forming the hub with a central flange, from the sides of which, near the periphery, project lateral flanges, forming rests for the packing-rings, which are placed in position on both sides of the projecting central flange by simply removing the side caps.

What I claim as my invention is—

The hub A, formed with the central annular flange $a$ and lateral flanges $b\,b$, near the periphery thereof, to form seats for the packing-rings $c\,d\,d$, in combination with the removable caps C C and the screws D, which pass through the caps and the central flange, all constructed as herein shown, for the purpose specified.

JACOB M. PALMER.

Witnesses:
HENRY T. BROWN,
MICHAEL RYAN.